Figure 1:
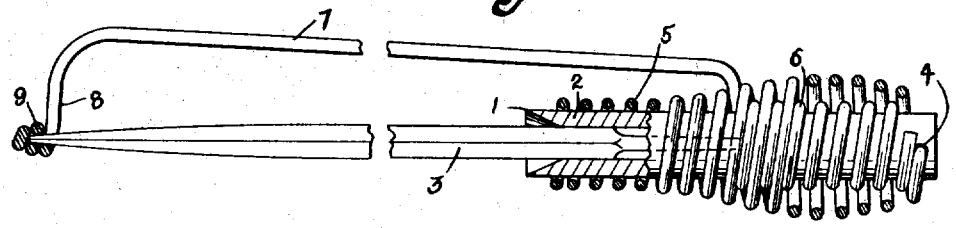

Nov. 23, 1926. Re. 16,486

L. D. GREENLAND

FILE HOLDER

Original Filed April 25, 1925

Witness
L. F. Sandberg

Inventor
Lloyd D. Greenland
by Bair & Freeman Attorneys

Reissued Nov. 23, 1926.

Re. 16,486

UNITED STATES PATENT OFFICE.

LLOYD DELNO GREENLAND, OF DES MOINES, IOWA.

FILE HOLDER.

Original No. 1,569,276, dated January 12, 1926, Serial No. 25,852, filed April 25, 1925. Application for reissue filed March 10, 1926. Serial No. 93,760.

The present invention relates to a file holder, and has for its principal object to provide an adjustable structure for holding files of different lengths.

Another important object of the invention is to provide a file holder especially designed for holding different size files.

A further object is to provide a handle element with a socket to receive the shank of a file and having a portion formed with a spiral thread structure, and to provide a coacting file holder member having means for holding the opposite end of the file, and having a member mounted on the handle to rotate therearound in threaded relation thereto.

A still further important object of the invention is to provide a file holder of this nature which is exceedingly simple in its construction, capable of being manufactured at a low cost, strong, durable, and well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
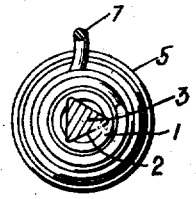

Figure 1 is an elevation of the holder embodying the features of my invention, showing portions in sections; and Figure 2 is a transverse section therethrough.

Referring to the drawing in detail, it will be seen that 1 designates a handle element having in one end a socket 2 for receiving the shank of a file 3. This socket may be varied in its shape for receiving shanks of different varieties of files, and therefore, I do not wish to be limited to the particular structure shown herein.

The handle is formed or provided with a spiral thread structure. This may be in any form suitable for the purpose. In the form illustrated in my drawings, the other end of the handle 1 is provided with a transversely extending opening 4. A coil spring member 5 is disposed about the handle 1 and has an end thereof projected through the opening 4 so as to prevent its rotation on the handle. The intermediate convolutions of the coil spring member 5, adjacent the end thereof which projects through the opening 4 are enlarged so as to provide a handle. A second coil spring member 6 is rotatably disposed about the handle 1 with its convolutions threaded between the convolution of the member 5, and terminates at one end in a rod 7 having a lateral extension 8 which is coiled to provide a socket 9 in axial alignment with the socket 2.

It will be noted that the rod 7 is substantially spaced from the line of the axes of the aligned sockets, to thus serve better as a member which can be conveniently gripped even near the extension 8 for better manipulating the file 3.

It will thus be seen that a file may be positioned with its shank end in the socket 2 and its other end in the socket 9 and the rod 7 may be revolved about the handle 1, thus causing movement of the member 6 on the handle 1 because of the threaded association between the members 5 and 6. It will thus be seen that the distance between the socket 9 and the end of the handle 1 may be adjusted to accommodate files of different lengths.

It will also be noted that the device is capable of ready and easy adjustment and may be manufactured at a comparatively low cost and will yet be strong and durable.

It is apparent that the present embodiment of the invention has been disclosed merely by way of example, and the numerous changes in the details of construction, and in the combination and arrangement of parts may be resorted to without departing from the spirit or scope of the invention as hereinafter claimed or sacrificing any of its advantages.

Having thus described the invention, which I claim as new and desire to secure by Letters Patent is:

1. In a holder of the class described, a handle element having a socket at one end, a coil member disposed about the handle a second coil member rotatably disposed about the handle and having its convolutions disposed in threaded relation between the convolutions of the first member, a rod extending from the second member and terminating in a socket axially aligned with the socket in the handle.

2. In a holder of the class described, a handle having a socket at one end, a coil member disposed about the handle, a second coil member rotatably disposed about the handle, and having its convolutions disposed in threaded relation between the convolutions of the first member, a rod extending from the second member and terminating in a socket axially aligned with the socket in the handle, one end of the first member being extended through the handle to fix it against rotation thereon.

3. A file holder, having a handle element adapted to receive one end of a file, a rod having an end portion adapted to rotatably receive the other end of a file, and another end provided with a portion having threaded relation with the handle and adapted to rotate spirally around the handle.

4. In a file holder, a handle having a socket, a rod having a socket at one end axially aligned with said first socket, an offset member at the other end of said rod having a threaded connection with the handle and adapted to rotate spirally around the handle.

5. A file holder, having a threaded handle element adapted to receive one end of a file, a rod having an end portion adapted to receive the other end of a file, and another end provided with a spiral coil mounted on the handle to rotate spirally therearound.

6. In a file holder, a handle having a socket, a rod having an offset socket at one end axially aligned with the first socket and having an offset spiral coil at its end opposite its socket, having a threaded rotatable connection with the handle, said rod being substantially spaced from the line of the axes of said sockets to permit it to be grasped for manipulating a file received in said sockets.

7. A file holder, having a handle element adapted to receive one end of a file, a rod having an end portion adapted to rotatably receive the other end of a file, and another end provided with a portion having a yielding threaded connection with the handle and adapted to rotate spirally around the handle.

LLOYD DELNO GREENLAND.